(12) United States Patent
Durand et al.

(10) Patent No.: US 8,731,468 B2
(45) Date of Patent: May 20, 2014

(54) DEVICES FOR POINT-TO-POINT WIRELESS HIGH-OUTPUT DATA TRANSMISSION BETWEEN A PARKED VEHICLE AND A FIXED INFRASTRUCTURE

(75) Inventors: Frederic Durand, Toulouse (FR); Pierre Gruyer, Toulouse (FR); Julien Abadie, Toulouse (FR); Christian Turpaud, Fonsorbes (FR); Sebastien Saletzki, Cornebarrieu (FR)

(73) Assignee: Airbus Operations S.A.S., Toulouse (FR)

( * ) Notice: Subject to any disclaimer, the term of this patent is extended or adjusted under 35 U.S.C. 154(b) by 310 days.

(21) Appl. No.: 12/867,190

(22) PCT Filed: Feb. 6, 2009

(86) PCT No.: PCT/FR2009/050194
§ 371 (c)(1),
(2), (4) Date: Aug. 11, 2010

(87) PCT Pub. No.: WO2009/106776
PCT Pub. Date: Sep. 3, 2009

(65) Prior Publication Data
US 2010/0311335 A1    Dec. 9, 2010

(30) Foreign Application Priority Data
Feb. 26, 2008 (FR) .................................... 08 51205

(51) Int. Cl.
*H04B 7/00* (2006.01)
(52) U.S. Cl.
USPC ......... 455/41.2; 455/41.1; 455/41.3; 343/705

(58) Field of Classification Search
CPC ........................................................ H04B 1/38
USPC ................ 455/98, 424, 426.1, 550.1, 562.1, 455/569.2, 575.7, 41.1–41.3, 456.1; 343/705
See application file for complete search history.

(56) References Cited

U.S. PATENT DOCUMENTS 6,401,013 B1 * 6/2002 McElreath ........................ 701/3
7,126,880 B2 * 10/2006 Motokawa et al. ............. 368/47
(Continued)

OTHER PUBLICATIONS

Martzaklis, (GUS) K: "Weather Information Communications (WINCOMM) Element Briefing Ultra-Wideband (UWB) Technology FOR Aircraft Data Communications (Slide 51) Ultra-Wideband Technology may benefit aviation environments in many ways", Weather Accident Prevention Annual Project Review, 2 pages, XP002498263, (May 23, 2000).

(Continued)

*Primary Examiner* — Tuan H Nguyen
(74) *Attorney, Agent, or Firm* — Oblon, Spivak, McClelland, Maier & Neustadt, L.L.P.

(57) ABSTRACT

A wireless high-rate communication device for a vehicle, adapted for data exchange between at least one computer system of the vehicle and at least one computer system of a structure separate from the vehicle. The device includes at least one antenna connected to at least one emitter/receiver in turn connected to the at least one computer system of the vehicle, the device adapted for exchanging data according to a point-to-point ultra-wideband communication mode, with a device of the structure including at least one antenna connected to at least one emitter/receiver in turn connected to at least one computer system of the structure when the at least one antenna of the vehicle is in a vicinity of the at least one antenna of the structure.

18 Claims, 5 Drawing Sheets

(56) References Cited

U.S. PATENT DOCUMENTS

Figure 1:
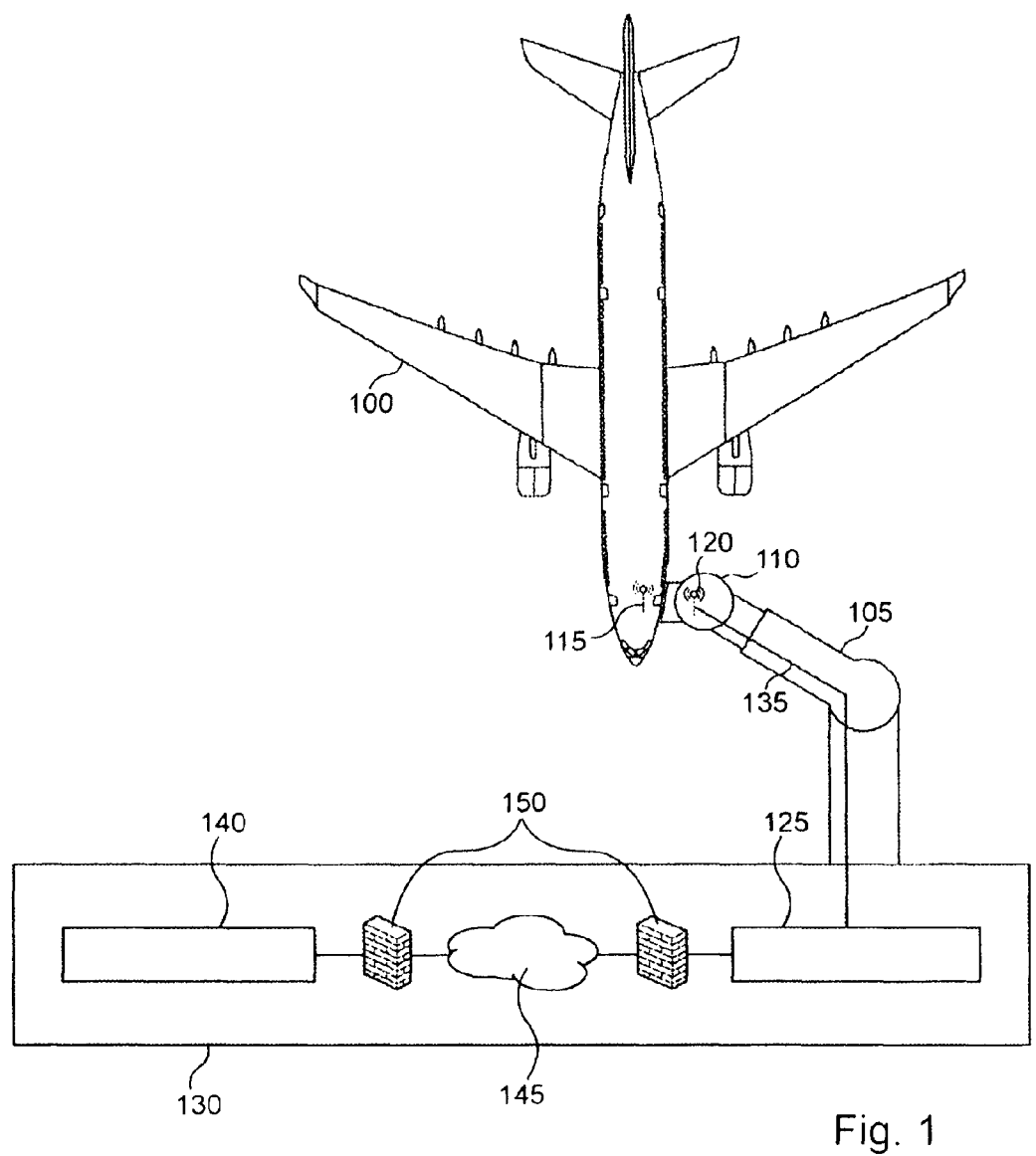

| | | |
|---|---|---|
| 7,960,675 B2 * | 6/2011 | Grabmeier .................. 244/3.19 |
| 2003/0130769 A1 | 7/2003 | Farley et al. |
| 2010/0105329 A1 | 4/2010 | Durand et al. |

OTHER PUBLICATIONS

Ely, J. Jay et al., "UltraWideBand Electromagnetic Interference to Aircraft Radios", $12^{th}$. DASC., The 21th., Digital Avionics Systems Conference Proceedings, vol. 2, pp. 13.E.4-1-13.E.4-12, XP010616282, ISBN: 978-0-7803-7367-9, (Oct. 27, 2002).

* cited by examiner

DEVICES FOR POINT-TO-POINT WIRELESS HIGH-OUTPUT DATA TRANSMISSION BETWEEN A PARKED VEHICLE AND A FIXED INFRASTRUCTURE

This invention relates to data transmission between a vehicle and a fixed system and more particularly to devices for point-to-point wireless high-output data transmission between a parked vehicle and a fixed infrastructure.

Many parked vehicles need to exchange data with a fixed infrastructure, in particular for maintenance operations or to provide passengers with a high-output connection to an open network.

First and foremost there are so-called wired solutions according to which it is necessary to implement a physical connection between the vehicle and the fixed infrastructure. For example, an Ethernet-type link using copper wires allows an output on the order of one hundred megabits per second. Nevertheless, while such solutions provide a very high data-transmission output, they require the presence of an operator to implement such a connection.

Furthermore, there are systems using wireless technologies, in particular infrared transmission technologies allowing very high transmission outputs but which pose alignment problems, the transmitter and the receiver having to be positioned according to a very precise configuration. These solutions also are sensitive to dust or other dirt that may at least partially block the transmitter and/or the infrared receiver.

Other wireless data transmission solutions also have been developed based on wireless network technologies, for example WiFi (acronym for Wireless Fidelity in English terminology, WiFi is a trade name) solutions, or on cellular telephony technologies, in particular allowing devices in an aircraft to exchange data with base stations set up in an airport. Nonetheless, such technologies provide limited outputs.

By way of illustration, for aircraft operation, more and more information items must be exchanged between the systems of an airline company on the ground and the aircraft, in particular when the latter are on stopover at the jetway of a terminal or in a maintenance phase in the hangar.

So that the duration of the stopover will not be directly subject to the time necessary for the exchange of information items between the ground and on board, the communications means used must be as high-performance as possible, that is to say that the output for transmission of the information items must be as high as possible.

Solutions, called gatelink in English terminology, using wireless local area network technologies, known under the name of WLAN (acronym for Wireless Local Area Network in English terminology), for example of WiFi type, or cellular telephony technologies, for example of GPRS (abbreviation for General Packet Radio Service in English terminology) type, are used. Nevertheless, these technologies generally do not provide sufficient service and performance quality levels: the pass band is reduced and must be shared among all the users in the coverage area.

Furthermore, since these technologies are shared and the network is visible to several users, the available pass band decreases in a way difficult to foresee according to the number of users.

The current solutions additionally pose security problems by reason of their range exceeding some tens or hundreds of meters, leading to risks of espionage and attacks.

Thus there is a need to improve the quality of the connections between a parked vehicle and a fixed infrastructure, in particular the output and the security of data transmission.

The invention makes it possible to resolve at least one of the problems set forth above.

The invention accordingly has as an object a wireless high-output communication device for a vehicle, the said device being adapted for allowing the data exchange between at least one computer system of the said vehicle and at least one computer system of a structure separate from the said vehicle, this device comprising at least one antenna connected to at least one transmitter/receiver itself connected to at least one computer system of the said vehicle, this device being adapted for exchanging data according to a point-to-point ultra-wideband communication mode with a device of the said structure comprising at least one antenna connected to at least one transmitter/receiver itself connected to the said at least one computer system of the said structure when the said at least one antenna of the said device for the said vehicle is in the vicinity of the said at least one antenna of the said device of the said structure.

In this way the device according to the invention allows high-output data transfer by implementing a connection with limited range between a parked vehicle and a fixed station, without wiring, for all types of vehicles. The small range of the wireless connection allows the device according to the invention to protect the exchanged data while the implementation of a wireless technology makes it possible to limit the human intervention necessary for establishment of the connection. The nature of the connection makes it possible to lessen the positioning constraints between the antennas of the vehicle and of the infrastructure, to limit the transmission problems linked to soiling of the transmitters/receivers and to allow the use of small-size antennas.

Advantageously, the device further comprises control means adapted for activating the said transmitter/receiver of the said device for the said vehicle according to a specific state of the said vehicle so as to activate the transmitter/receiver only under certain conditions, for example when the vehicle is parked.

The said at least one antenna of the said device for the said vehicle preferably is positioned so as to allow establishment of a direct radio link with the said at least one antenna of the said device of the said structure in order to improve the connection and increase the data-exchange output.

According to a specific embodiment, the said vehicle is an aircraft, the said at least one antenna of the said device for the said vehicle preferably being placed in a passenger door of the said aircraft, toward the inside or toward the outside of the said aircraft, on a jamb of the said door, on a window of the said door or in the fuselage of the said aircraft, near the said door, toward the outside of the said aircraft. The position of the antenna thus makes it possible to easily establish a radio connection with an antenna situated at the end of a passenger jetway.

Advantageously, the said at least one antenna of the said device for the said vehicle is protected by a material more or less permeable to radio waves.

The invention also has as an object an aircraft comprising the device described above.

The invention likewise has as an object a wireless high-output communication device for a structure, the said device being adapted for allowing data exchange between at least one computer system of the said structure and at least one computer system of a vehicle separate from the said structure, this device comprising at least one antenna connected to at least one transmitter/receiver itself connected to the said at least one computer system of the said structure, this device being adapted for exchanging data according to a point-to-point ultra-wideband communication mode with a device of the said vehicle comprising at least one antenna connected to at least one transmitter/receiver itself connected to the said at least one computer system of the said vehicle when the said at least one antenna of the said device of the said vehicle is in the vicinity of the said at least one antenna of the said device for the said structure.

In this way the device according to the invention allows the high-output data transfer by implementing a connection with limited range between a parked vehicle and a fixed station, without wiring, for all types of vehicles. The small range of the wireless connection allows the device according to the invention to protect the exchanged data while the implementation of a wireless technology makes it possible to limit the human intervention necessary for establishment of the connection. The nature of the connection makes it possible to lessen the positioning constraints between the antennas of the vehicle and of the infrastructure, to limit the transmission problems linked to soiling of the transmitters/receivers and to allow the use of small-size antennas.

According to a specific embodiment, the said structure is part of an airport, the said at least one antenna and the said at least one transmitter/receiver of the said device for the said structure being positioned at the end of a jetway, the said at least one antenna of the said device for the said structure being adapted for cooperating with the said at least one antenna of the said device for the said vehicle such as described above. In this way the position of the antenna makes it possible to easily establish a radio connection with an antenna situated near an aircraft passenger door.

Still according to a specific embodiment, the said at least one antenna of the said device for the said vehicle or for the said structure is an antenna of equiangular spiral patch antenna type or a biconical antenna. The use of such an antenna allows an easy integration thereof into the vehicle or into the structure while providing good communication performance.

The invention also has as an object a method adapted for using the device as described above.

Figure 2:
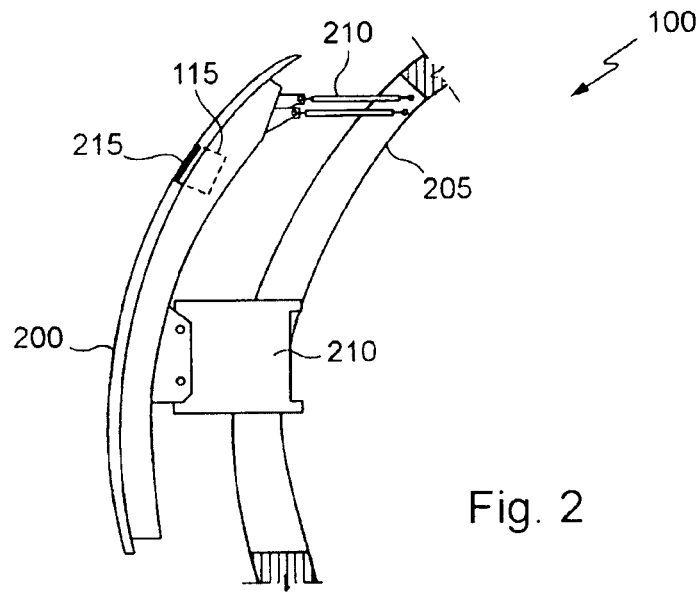
Figure 3:
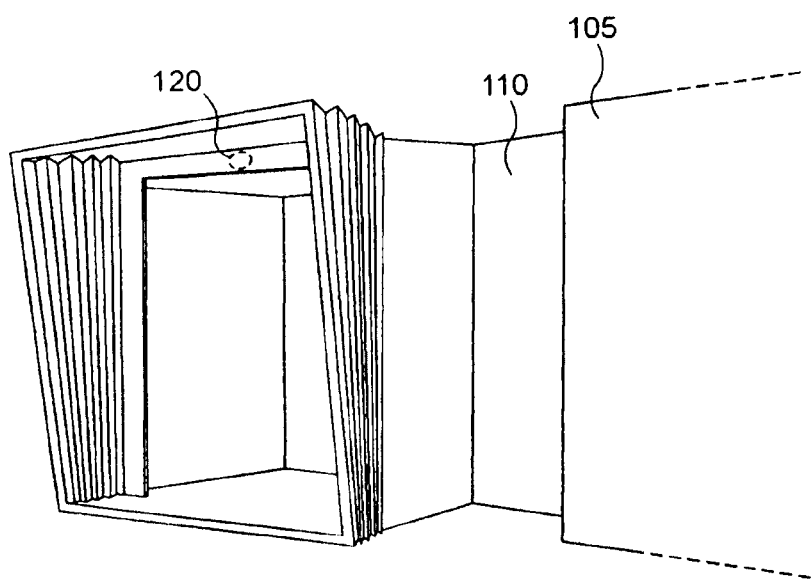
Figure 4:
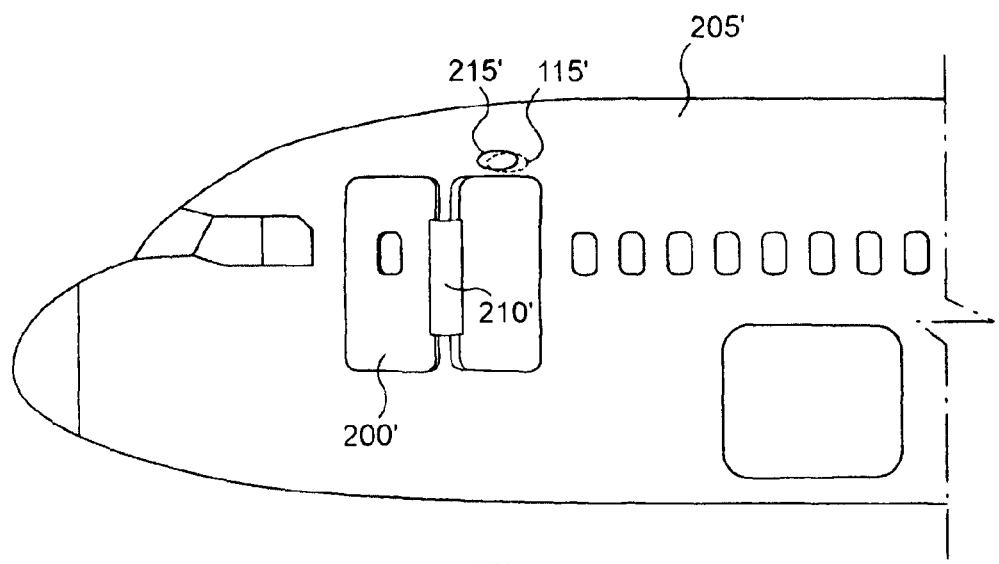
Figure 5A:
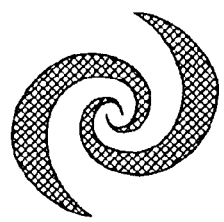
Figure 5B:
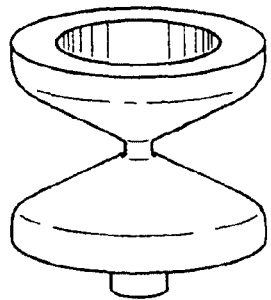
Figure 6:
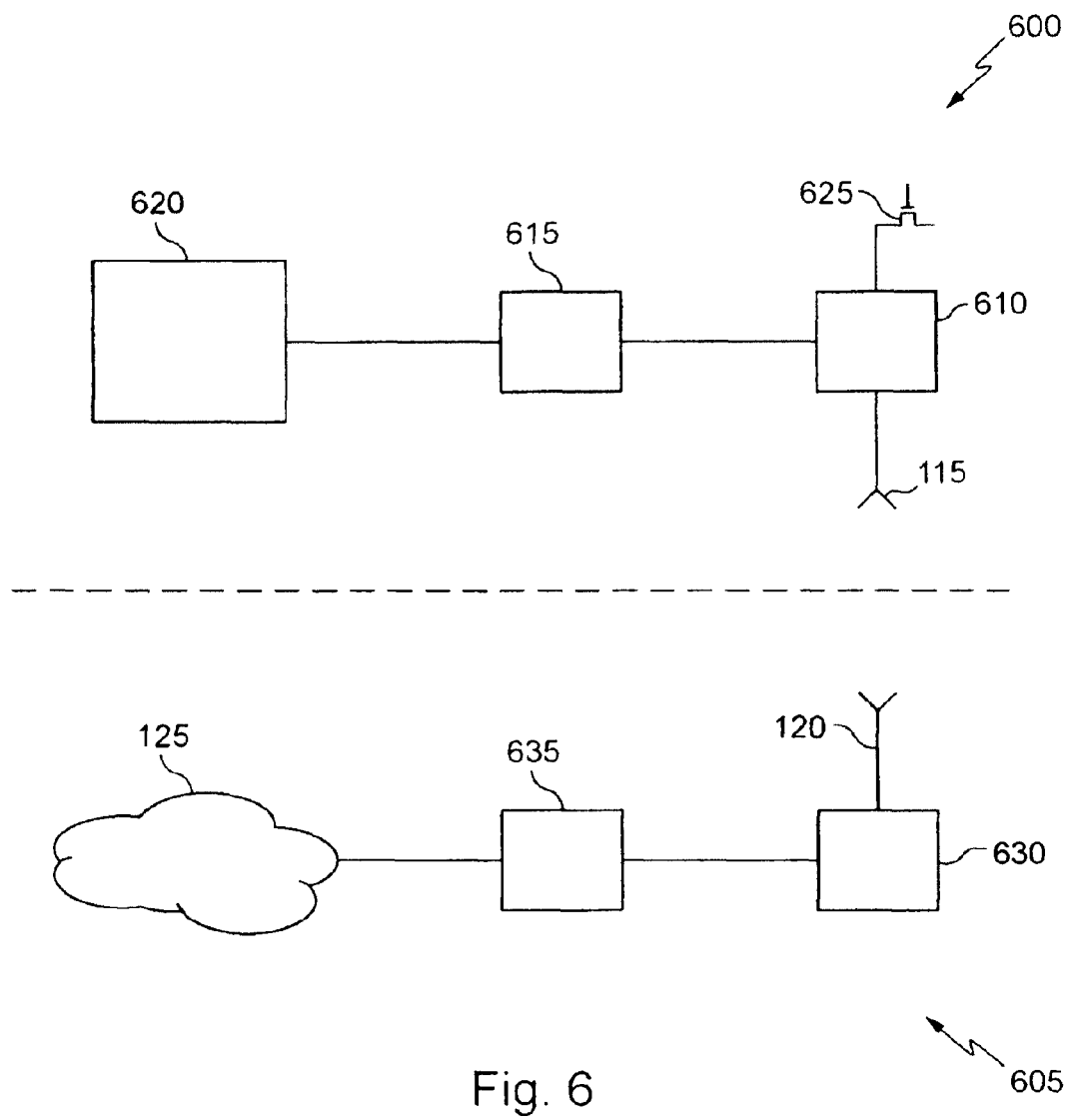
Figure 7:
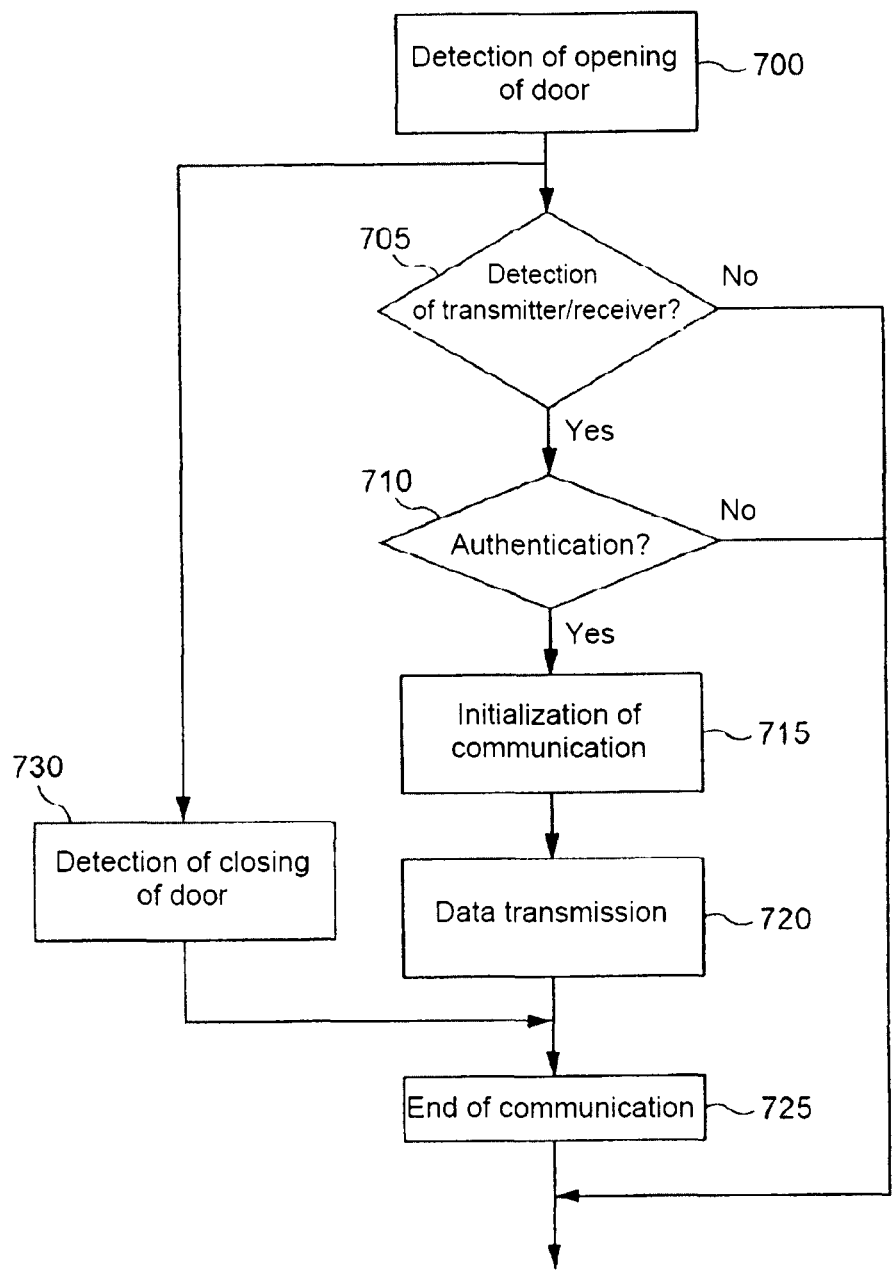

Other advantages, purposes and characteristics of this invention become apparent from the detailed description that follows, presented by way of non-limitative example, with reference to the attached drawings in which:

FIG. 1 schematically illustrates an aerial view of an aircraft parked near a jetway, allowing a high-output data transfer between the aircraft and a system on the ground;

FIG. 2 schematically illustrates, along a side section, the positioning of a UWB antenna in the front passenger door of an aircraft;

FIG. 3 schematically shows, in perspective, the end of a jetway beside which an aircraft may be parked, this jetway end comprising a UWB antenna allowing an aircraft high-output data exchange with a system on the ground;

FIG. 4 schematically illustrates, in perspective, the positioning of a UWB antenna in a cavity of the fuselage of an aircraft;

FIG. 5, comprising FIGS. 5*a* and 5*b*, presents two exemplary antennas that may be used to implement the invention;

FIG. 6 schematically illustrates the assemblies used in the aircraft and in the structure on the ground; and, FIG. 7 illustrates an exemplary algorithm that may be used in an aircraft to allow a data exchange with a structure on the ground when same is parked.

Although the implementation of the invention such as presented in the remainder of the description makes reference to aeronautics, this solution may be used for any type of connection between a vehicle and a structure such as a fixed infrastructure, in particular for the automobile industry, ships, missiles and UAVs (abbreviation for unmanned aerial vehicle in English terminology).

The device according to the invention makes it possible to connect a parked vehicle to a fixed infrastructure for data transfer, that is to say the loading and downloading of data, according to a very high-output point-to-point type wireless technology, for example of WPAN (acronym for Wireless Personal Area Network in English terminology) type. It is recalled that a point-to-point connection is a link between two systems, not allowing the connection of a third system, unlike a network-type connection.

The vehicle here is fixed and parked in the vicinity of a transmission/reception station with which it communicates in point-to-point mode. The antennas of the two systems preferably are in direct view, that is to say that there is no obstacle between the two. Furthermore it is possible to use a directing device in order to improve the efficiency of the link.

In order to allow very high outputs, the invention uses a wireless technology utilizing an ultra-wideband, also called UWB (abbreviation for UltraWide Band in English terminology), of WPAN type, for example meeting IEEE standard 802.15, according to which a point-to-point radio communication is established at very short range and at high or very high output.

The UWB technology uses a radio modulation based on the transmission of very short pulses. In France the frequency band assigned to UWB ranges between 4.8 GHz and 6 GHz while in the United States it ranges between 3.1 GHz and 10.6 GHz. In this frequency band, the maximum authorized PIRE (acronym for Puissance Isotrope Rayonnée Equivalente [Equivalent Radiated Isotropic Power]) density is −41 dBm/MHz. The theoretical output of a UWB link is 480 Mbits/s at 2 meters and 200 Mbits/s at 4 meters.

Such a type of connection is used, for example, between an aircraft and a jetway or between an aircraft and a maintenance hangar.

Although these wideband technologies are intended for domestic uses such as data exchanges between a computer and a wireless storage key, they have numerous advantages here, including performance and confidentiality.

Compared to the UWB/WPAN solutions, the technologies of WiFi, WiMAX or 3G type provide much lower useful outputs because of their higher range and the greater number of users in the coverage area utilizing the available pass band. The implementation of UWB/WPAN solutions makes it possible to optimize the use of the available pass band, entirely dedicated to the aircraft, and therefore provide performances that cannot be achieved with the technologies mentioned above.

In addition, the very short range of the wideband technologies used provides better conditions for ensuring the confidentiality of the exchanged data.

Furthermore, such wireless technologies allow a use without an operator, therefore simple and rapid. They also avoid wear and tear on mechanical components such as connectors.

Finally, the health risk linked to the use of UWB/WPAN-type technologies is limited because they are intended for domestic uses.

These technologies may be implemented with directional antennas preferably having a staggered main lobe in order to allow a margin of error in positioning on the order of one meter.

The very wideband technologies, called spread spectrum in English terminology, allow low or even very low transmission powers, limiting interferences on the existing systems and contributing to the confidentiality of the exchanges.

After a possible authentication check, the vehicle initiates the communication. Data transfers then may begin. In the aeronautical variant, the door advantageously is open so that the ground and on-board antennas are in view of one another.

In the case of an aeronautical use, the architecture implemented for data transfer comprises the following elements:
- on the aircraft side, these components comprise an integrated antenna (for example on a front passenger door) and a transmitter/receiver linked to this antenna and installed near the latter (here, in the door), the transmitter/receiver being connected to a relay or directly to a router installed, for example, in the hold of the aircraft, which is connected to the computer system of the vehicle. It should be noted that the relay may be wired to the router or communicate in the same type of wireless technology (WPAN);
- on the fixed infrastructure side, the components also comprise an integrated antenna (for example on the jetway opposite the door) and a transmitter/receiver linked to this antenna and installed near the latter, the transmitter/receiver being connected to a relay or directly to a router installed on the jetway or in the airport, which is connected to the computer system of the airport or of the airline company.

According to a specific embodiment, the antenna of the aircraft is placed in the front door thereof. Such an implementation makes it possible to avoid altering the structure of the aircraft for the installation of this antenna. UWB product studies show that the antenna may be positioned in a circular cavity on the order of ten centimeters in diameter and up to five to ten centimeters deep, covered with an epoxy layer to ensure impermeability while providing a good dielectric constant.

It should be noted that the installation of the antenna in a door allows a consequent saving in installation cost, in particular for aircraft in operation.

The position of the antenna on the fixed infrastructure is studied so that the two antennas are in direct view when the door is open.

The use of UWB technology makes it possible, in particular, to allow fairly significant positioning errors, on the order of several tens of centimeters. It therefore is not necessary to provide antenna positioning mechanisms. The establishment of the connection is facilitated.

FIG. 1 schematically illustrates an aerial view of an aircraft parked near a jetway. As shown, aircraft 100 is parked near a jetway 105, such that a door of aircraft 100 is facing end 110 of jetway 105.

Aircraft 100 comprises a UWB antenna 115, situated in the interior thereof, preferably near the front door and activated only if this door is open. UWB antenna 115 is connected to a computer system of aircraft 100, for example to the maintenance system, through an appropriate communication interface.

End 110 of jetway 105 comprises a UWB antenna 120 preferably positioned in direct view of UWB antenna 115.

The radio module (not shown) associated with UWB antenna 120 is connected to network 125 of airport terminal 130 by a link 135, here a wired link. Network 125 is connected, for example, to local area network 140 of the airline company via a network 145 of Internet type through firewalls 150 (called firewall in English terminology).

Similarly, a UWB antenna, connected to the network of the local company, may be placed on a structural element, movable or otherwise, removable or otherwise, of a maintenance hangar in order to be positioned near the door of aircraft 100 comprising UWB antenna 115 when the aircraft is in the maintenance hangar.

FIG. 2 schematically illustrates the positioning of UWB antenna 115 in a front passenger door 200 of aircraft 100. Door 200 here is connected to fuselage 205 through opening means 210. UWB antenna 115 is placed in a cavity of door 200, open toward the outside, and protected from outside stresses by an epoxy layer 215.

FIG. 3 schematically shows end 110 of a jetway 105 comprising a UWB antenna 120. UWB antenna 120 here is placed above the passage of the jetway, in the middle, so as to be approximately opposite UWB antenna 115 when the end of the jetway is in use position, facing front passenger door 200 of aircraft 100.

According to a first variant, the antenna installed in the aircraft is glued onto the window of the front passenger door, which allows a very easy installation. The antenna here preferably is an adhesive patch antenna. Since these antennas generally are omnidirectional antennas, performances are overall less favorable than those linked to the embodiment described above. In addition, because of the presence of glue, these antennas are less reliable. Nonetheless, this solution has the advantage of a very easy installation.

According to a second variant, the antenna is fastened onto the door, on its inner face, that is to say toward the cabin of the aircraft when the door is closed. Such a solution is particularly appropriate for aircraft for which the door pivots toward the outside (instead of moving in translation). This solution has the advantage of a very simple installation, without pressurization stress.

According to a third variant, the antenna is installed in a cavity of the fuselage of the aircraft, as illustrated on FIG. 4. Front door 200' here is connected to fuselage 205' through opening means 210'. UWB antenna 115' is placed in a cavity of fuselage 205', open toward the outside, and protected from outside stresses by an epoxy layer 215'. Such an embodiment may be attractive in the case where a positioning on the door does not make it possible to ensure connection with the ground antenna.

According to a fourth variant, the antenna is fastened onto the frame of the door, advantageously toward the inside. This position has the advantage of altering neither the structure of the door nor the fuselage of the aircraft. This embodiment is particularly advantageous in the case where positioning on the frame of the door makes it possible to have a direct view over the antenna set up on the infrastructure on the ground.

Several antenna types and technologies may be used. In particular, it is possible to use directional antennas or omnidirectional antennas.

FIG. 5, comprising FIGS. 5a and 5b, presents two exemplary antennas that may be used to implement the invention. FIG. 5a illustrates an equiangular spiral patch antenna while FIG. 5b shows a biconical antenna.

The equiangular spiral patch antenna of FIG. 5a may be used in the aircraft and/or at the end of a jetway. Here it concerns a quasi-directional antenna having a gain of 9 dB and an impedance of 59 ohms over the entire band, its external ray being 2.25 cm and the length of its arms being 6 cm.

The biconical antenna illustrated on FIG. 5b is made up of two cones connected at their ends. With its opened-out shape, this antenna is a wideband antenna. Placed in a vertical plane, these two cones form an omnidirectional radiation diagram.

Several simulations have been carried out from these two antennas, in particular the following:

- use of an omnidirectional antenna having a small gain of approximately 0.5 dB at the end of a jetway and a directive antenna having a gain of 9 dB in the aircraft;
- use of an omnidirectional antenna having a small gain of approximately 0.5 dB at the end of a jetway and in the aircraft; and,
- use of a directional antenna having a gain of 9 dB at the end of a jetway and in the aircraft.

To sum up, considering a distance of approximately 2 meters between the antennas, starting from the assumption according to which the link is established in direct view and taking into account the attenuation of the signal in the epoxy layer used to protect the antenna in the aircraft, the end result of the calculations shows that the solution using two directional antennas is the most pertinent. The distance of approximately 2 meters between the antennas is the typical distance contemplated for this application of data transfer between the aircraft and the jetway.

Nonetheless, the other solutions also work provided that the distance between the antennas is compatible and the sensitivity of the receiver is adapted.

It should be noted that these calculations are based on the configuration according to which the antenna in the aircraft is covered with an epoxy layer, that is to say the most unfavorable configuration.

In order to improve the link, a signal amplifier may be used in the reception chain.

FIG. 6 schematically illustrates the assemblies used in the aircraft and in the structure on the ground. The part referenced 600 relates to components used in the aircraft while the part referenced 605 applies to components used in the structure on the ground.

As indicated above, an antenna 115 positioned, for example, in the front passenger door or near the latter, is connected to a radio transmitter/receiver 610, itself connected to a computer system 620, for example a maintenance server, via a router 615. Radio transmitter/receiver 610 advantageously is connected to a control device 625 making it possible to activate radio transmitter/receiver 610 only when the door in which, or near which, antenna 615 is installed is open.

According to a specific embodiment, radio transmitter/receiver 610 makes it possible to convert a digital signal to a radio signal and vice versa. By way of illustration, radio transmitter/receiver 610 may juxtapose Ethernet frames on a radio link forming, for example, a radio signal in which the frequency spectrum is divided into channels and in which the information items are transmitted with a modulation of OFDM (abbreviation for Orthogonal Frequency Division Multiplexing in English terminology) type in each channel.

Coding on several channels makes it possible to make the most of the variety of frequencies and to withstand interferences and multipaths.

OFDM modulation consists in dividing the digital signal to be transmitted over a large number of carriers. In order to reduce zigzag-reflection phenomena, a multitude of carriers distributed in the same channel is used. Even though the signals of the different carriers may overlap, there is no interference because of the orthogonality. The signal to be transmitted generally is repeated on different carrier frequencies. In this way, in a transmission channel with multiple paths where certain frequencies are destroyed because of the destructive combination of paths, the system is able to retrieve the lost information on other carrier frequencies that are not destroyed. OFDM modulation is based on rapid Fourier transforming and the reverse thereof.

As illustrated on FIG. 6, the fixed structure on the ground comprises an antenna 120 positioned, for example, at the end of a jetway and connected to a radio transmitter/receiver 630, itself connected to a network 125 such as the network of the airport, via a router 635. Radio transmitter/receiver 630 here is similar to transmitter/receiver 610.

Advantageously, when control device 625 detects the opening of the door in which or near which antenna 115 is positioned, the transmitter/receiver is activated and an instruction is transmitted to computer system 629 in order to inform it. A connection procedure then is initiated in order to allow data transmission between the aircraft and the structure on the ground.

FIG. 7 illustrates an exemplary algorithm that may be used in the aircraft in order to allow a data exchange with a structure on the ground when it is parked.

After having detected the opening of the door in which or near which antenna 115 is positioned (step 700), a request is transmitted by computer system 620 through router 615, transmitter/receiver 610 and antenna 115 to detect the possible presence of a transmitter/receiver 630 on the ground (step 705). If no response to this request is received, computer system 620 infers therefrom the absence of a communication device in the structure on the ground and the communication process stops. Several connection attempts may be made. For example, three requests one minute apart may be transmitted.

If, on the contrary, computer system 620 receives a response to the request, an authentication step is started (step 710). The authentication step may consist, for example, in transmitting a message comprising a signature, authentication of the signature being accomplished with a public key. Upon reception of the signed message, the computer system of the structure on the ground may authenticate the aircraft and, in response, transmit a signed message to the latter which then, in turn, may authenticate the system on the ground.

If the aircraft does not authenticate the system on the ground or if the system on the ground does not respond to the request for authentication, the communication process stops.

On the contrary, if the aircraft authenticates the system on the ground, communication between the aircraft and the system on the ground is established (step 715) and data may be exchanged between the computer system of the aircraft and that of the structure on the ground (step 720). The data here are transferred according to a standard mechanism and standard communication protocols.

When the data transfer is completed, the communication is ended (step 725).

In the same way, if control device 625 detects the closing of the door in which or near which antenna 115 is positioned (step 730), the communication is ended (step 725).

Naturally, in order to meet specific needs, an individual competent in the area of the invention will be able to apply modifications in the above description. In particular, the invention may be implemented between two vehicles stopped in the vicinity of one another.

The invention claimed is:

1. A high-output wireless communication device for a parked vehicle, the high-output wireless communication device being adapted to allow data exchange between at least one computer system of the vehicle and at least one computer system of a structure, the structure is separate and located external to the vehicle, the high-output wireless communication device comprising:

at least one antenna connected to at least one transmitter/receiver, and the at least one transmitter/receiver is connected to the at least one computer system of the vehicle, wherein the high-output wireless communication device is adapted to exchange data according to a point-to-point short-range ultra-wideband communication mode with a device of the structure including at least one antenna connected to at least one transmitter/receiver, and wherein the at least one transmitter/receiver of the high-output wireless communication device is connected to the at least one computer system of the structure, when the at least one antenna of the high-output wireless communication device for the vehicle is in a vicinity of the at least one antenna of the device of the structure, via the at least one antenna of the high-output wireless communication device for the vehicle and the at least one antenna of the device of the structure.

2. A device according to claim 1, further comprising a control unit configured to activate the transmitter/receiver of the high-output wireless communication device for the vehicle according to a specific state of the vehicle.

3. A device according to claim 1, wherein the at least one antenna of the high-output wireless communication device for the vehicle is positioned to allow establishment of a direct radio link with the at least one antenna of the device of the structure.

4. A device according to claim 3, wherein the vehicle is an aircraft, and the at least one antenna of the high-output wireless communication device for the vehicle is placed in one of a passenger door of the aircraft, toward an inside or toward an outside of the aircraft, on a jamb of the door, on a window of the door, or in a fuselage of the aircraft, near the door, toward the outside of the aircraft.

5. A device according to claim 3, wherein the vehicle is an aircraft and the at least one antenna of the high-output wireless communication device for the vehicle is placed in a passenger door of the aircraft.

6. A device according to claim 5, wherein the at least one antenna of the high-output wireless communication device for the vehicle is placed in a cavity of the passenger door of the aircraft.

7. A device according to claim 5, wherein the at least one antenna of the high-output wireless communication device for the vehicle is covered by an epoxy layer.

8. A device according to claim 1, wherein the at least one antenna of the high-output wireless communication device for the vehicle is protected by a material more or less permeable to radio waves.

9. A device according to claim 8, wherein the at least one antenna of the high-output wireless communication device for the vehicle is one of an equiangular spiral patch antenna or a biconical antenna.

10. A method implemented by the device according to claim 1.

11. An aircraft comprising the device according to claim 1.

12. A device according to claim 1, wherein the at least one antenna of the high-output wireless communication device for the vehicle wirelessly transmits a request signal to detect, in the vicinity of the at least one antenna of the high-output wireless communication device for the vehicle, a presence of the at least one antenna of the device of the structure.

13. A device according to claim 12, wherein a connection is established between the at least one transmitted/receiver of the high-output wireless communication device and the at least one computer system of the structure when the at least one antenna of the device of the structure wirelessly responds to the request signal from the at least one antenna of the high-output wireless communication device.

14. A device according to claim 13, wherein the connection between the at least one transmitted/receiver of the high-output wireless communication device and the at least one computer system of the structure is ended when a closing of a door of the vehicle is detected by a control device of the vehicle.

15. A device according to claim 12, wherein the request signal from the at least one antenna of the high-output wireless communication device is transmitted automatically when an opening of a door of the vehicle is detected by a control device of the vehicle.

16. A high-output wireless communication device for a structure, the high-output wireless communication device adapted to allow data exchange between at least one computer system of the structure and at least one computer system of a parked vehicle, separate and located external to the structure, the high-output wireless communication device comprising:
at least one antenna connected to at least one transmitter/receiver, and the at least one transmitter/receiver is connected to the at least one computer system of the structure,
wherein the high-output wireless communication device is adapted to exchange data according to a short-range, ultra-wideband point-to-point communication mode with a device of the vehicle including at least one antenna connected to the at least one transmitter/receiver, and
wherein the at least one transmitter/receiver of the high-output wireless communication device is connected to the at least one computer system of the vehicle, when the at least one antenna of the high-output wireless communication device of the vehicle is in a vicinity of the at least one antenna of the device for the structure, via the at least one antenna of the high-output wireless communication device for the vehicle and the at least one antenna of the device of the structure.

17. A device according to claim 16, wherein the structure is a part of an airport, the at least one antenna and the at least one transmitter/receiver of the device for the structure being positioned at an end of a jetway, the at least one antenna of the device for the structure being adapted to cooperate with the at least one antenna of the high-output wireless communication device for the vehicle.

18. A device according to claim 16, wherein the at least one antenna of the device for the structure is one of an equiangular spiral patch antenna or a biconical antenna.

* * * * *